(12) United States Patent
Belak

(10) Patent No.: US 8,751,188 B2
(45) Date of Patent: Jun. 10, 2014

(54) PHOTOLUMINESCENT TEMPERATURE SENSOR UTILIZING SINGULAR ELEMENT FOR EXCITATION AND PHOTODETECTION

(75) Inventor: Roy Belak, Vancouver (CA)

(73) Assignee: Powell Canada, Inc., Vancouver, British Columbia (CA)

( * ) Notice: Subject to any disclaimer, the term of this patent is extended or adjusted under 35 U.S.C. 154(b) by 384 days.

(21) Appl. No.: 13/089,183

(22) Filed: Apr. 18, 2011

(65) Prior Publication Data

US 2012/0029864 A1 Feb. 2, 2012

Related U.S. Application Data

(60) Provisional application No. 61/325,299, filed on Apr. 17, 2010.

(51) Int. Cl.
| | |
|---|---|
| *G01K 11/00* | (2006.01) |
| *G06F 19/00* | (2011.01) |
| *G01J 1/04* | (2006.01) |
| *G01J 1/58* | (2006.01) |
| *G01J 5/08* | (2006.01) |
| *G01J 5/28* | (2006.01) |
| *G01K 11/32* | (2006.01) |

(52) U.S. Cl.
CPC .............. *G01J 1/0425* (2013.01); *G01J 1/58* (2013.01); *G01J 5/08* (2013.01); *G01J 1/04* (2013.01); *G01J 5/28* (2013.01); *G01K 11/3213* (2013.01); *G01J 5/0821* (2013.01)
USPC ........... 702/134; 374/159; 374/161; 436/136; 702/136

(58) Field of Classification Search
CPC ............ G01J 1/0425; G01J 1/58; G01J 5/08; G01J 1/04; G01J 5/28; G01J 5/0821; G01K 11/3213; G01K 11/32; G06F 3/041; G06F 3/0414
USPC ............... 702/130–136, 159, 172; 250/459.1; 374/120, 131, 152, 159, 161; 436/136
See application file for complete search history.

(56) References Cited

U.S. PATENT DOCUMENTS

| | | | |
|---|---|---|---|
| 4,448,547 | A | 5/1984 | Wickersheim |
| 4,560,286 | A | 12/1985 | Wickersheim |
| 4,652,143 | A | 3/1987 | Wickersheim |
| 4,752,141 | A | 6/1988 | Sun |
| 4,776,827 | A | 10/1988 | Greaves |
| 4,789,992 | A | 12/1988 | Wickersheim |
| 4,988,212 | A | 1/1991 | Sun |
| 5,043,286 | A * | 8/1991 | Khalil et al. ............. 436/136 |
| 5,107,445 | A | 4/1992 | Jensen |
| 5,414,266 | A | 5/1995 | Sun |
| 5,779,365 | A | 7/1998 | Takaki |

(Continued)

OTHER PUBLICATIONS

International Search Report and Written Opinion, PCT/CA2011/000438, dated Aug. 22, 2011, 7 pages.

*Primary Examiner* — John H Le
(74) *Attorney, Agent, or Firm* — Winstead PC

(57) ABSTRACT

A photoluminescent temperature sensing device and method utilizing a semi-conductor optical device adapted to operate as both a light-emitting device and a light detection device. The optical device emits a pulse of incident light, producing photoluminescent light that is received at the optical device. Signal information associated with a temperature-dependent characteristic of the photoluminescent light is created and temperature information if obtained from the signal information.

15 Claims, 4 Drawing Sheets

(56) References Cited

U.S. PATENT DOCUMENTS

| | | |
|---|---|---|
| 6,870,325 B2 | 3/2005 | Bushell |
| 7,080,940 B2 | 7/2006 | Gotthold |
| 7,377,689 B2 | 5/2008 | Balan |
| 2009/0135880 A1 | 5/2009 | Ichida |
| 2009/0135881 A1 | 5/2009 | Kinugasa |
| 2009/0157346 A1 | 6/2009 | Kinugasa |
| 2009/0245326 A1 | 10/2009 | Kinugasa |
| 2009/0261751 A1 | 10/2009 | Kinugasa |
| 2009/0296770 A1 | 12/2009 | Kinugasa |
| 2009/0296778 A1 | 12/2009 | Kinugasa |

* cited by examiner

PHOTOLUMINESCENT TEMPERATURE SENSOR UTILIZING SINGULAR ELEMENT FOR EXCITATION AND PHOTODETECTION

RELATED APPLICATIONS

This application is a non-provisional application claiming benefit of provisional application No. 61/325,299 filed on 17 Apr. 2010.

BACKGROUND

This section provides background information to facilitate a better understanding of the various aspects of the invention. It should be understood that the statements in this section of this document are to be read in this light, and not as admissions of prior art.

The invention relates generally to temperature measuring techniques, and, more specifically, to devices and methods for optical measurement of temperature in an environment.

Optical temperature measuring techniques are well known in the art. There are several optical phenomena which can be exploited to enable temperature measurement by a sensor, analogous to the way in which thermocouples exploit the thermoelectric effect. These optical methods include white light interferometry, photonic band-gap measurement, and photoluminescent decay. Each method has advantages and disadvantages which limits their general application.

Photoluminescent temperature measurement techniques are particularly suitable for applications in environments having strong electric and/or magnetic fields and the like, where metal sensors cannot be relied upon to provide accurate results because the metal is heated when immersed in the electromagnetic field, causing a bias in the readings. In addition, sensors utilizing metal components and conductors often provide an unsafe path for dielectric breakdown in environments where high voltages are present.

Photoluminescent decay methods comprise the use of a material with photoluminescent properties which are temperature dependent. Typically in the form of a sensor at the end of a fiber optic cable, the photoluminescent material is excited to luminescence by sending excitation radiation of one wavelength to the sensor, and the resulting light emitted through photoluminescence (the photoluminescent light) at a different wavelength is photo-detected. The detected signal is then processed to determine the temperature of the photoluminescent material in the sensor. The prior art photoluminescent temperature sensing devices and methods utilize separate optical devices for the source of the incident light and for the photodetector.

SUMMARY

According to one or more aspects of the invention, a temperature sensor includes a photoluminescent material optically connected to a single optical device, wherein the single optical device emits an incident light to the photoluminescent material and the single optical device receives a photoluminescent light produced in response to the incident light.

A system according to one or more aspects of the invention for determining the temperature in an environment comprises a semi-conductor optical device adapted to operate as both a light-emitting device and a light detection device; a photoluminescent material adapted to be disposed within the environment; an optic fiber disposed between the semi-conductor optical device and the photoluminescent material for transmitting incident light from the semi-conductor optical device configured as a photo-emitter to the photoluminescent material, and for transmitting photoluminescent light from the photoluminescent material to the same semi-conductor optical device configured as photo-detector; a circuit for driving the optical device including a switch; and a processor operatively connected to the driving circuit and configured to execute a method comprising the steps of driving the optical device to emit a pulse of incident light, thereby producing photoluminescent light from the photoluminescent material, receiving the photoluminescent light with the optical device, and creating signal information associated with a temperature-dependent characteristic of the photoluminescent light, and deriving temperature information from the signal information.

An embodiment of a method of determining the temperature of an environment using a single semi-conductor optical device optically connected to a photoluminescent material disposed within the environment comprises emitting a pulse of incident light in response to driving the optical device; producing photoluminescent light from the photoluminescent material in response to the incident light; receiving the photoluminescent light with the optical device; creating signal information associated with a temperature-dependent characteristic of the photoluminescent light received; and deriving temperature information from the signal information.

The foregoing has outlined some of the features and technical advantages of the invention in order that the detailed description of the invention that follows may be better understood. Additional features and advantages of the invention will be described hereinafter which form the subject of the claims of the invention.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
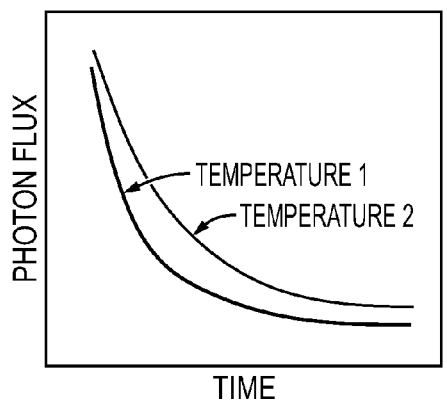
FIG. 1 is a graphical illustration of an example of temperature dependant photon flux of a photoluminescent material following excitation with incident light.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The invention relates to a system and method of temperature measurement using optical methods and a photoluminescent material. Photoluminescent temperature measurement techniques are particularly suitable for applications in environments having strong electric and/or magnetic fields and the like, where metal sensors cannot be relied upon to provide accurate results because the metal is heated when immersed in the electromagnetic field, causing a bias in the readings. In addition, sensors utilizing metal components and conductors often provide an unsafe path for dielectric breakdown in environments where high voltages are present.

As used herein, the term "photoluminescent material" means any material which emits light of a certain wavelength upon being excited by incident light. The term "semi-conductor optical device" means a component comprising a semiconductor material which possesses the properties of electroluminescence to produce the incident light which excites the photoluminescent material, and photosensitivity to the photoluminescent light produced by the excited photoluminescent material.

In a typical prior art device, separate photo-emitter and photo-detector devices are used in conjunction with one another to determine the temperature dependant properties of a photoluminescent material, and therefore the temperature at which the photoluminescent material is currently held. Photons of a particular wavelength are generated by a light source, such as a light emitting diode (LED), laser, or other narrow-band source. These photons are used to illuminate a photoluminescent material, which photoluminesces after excitation from the incident photons. In a contemporary method, the incident photons and photoluminesced photons will have different prominent wavelengths, but this need not always be the case. At least a portion of the photoluminesced photons then become incident on a photo-detecting element. Conventionally, wavelength selective filters are used to ensure that the photo-detector only senses the photoluminesced photons. In addition, light-guiding fibers and focusing optics are often used to increase the flux of photons both used for excitation of the photoluminescent material and detection of the photoluminesced photons. Basic concepts of photoluminescent-based temperature sensing are described in U.S. Pat. No. 4,448,547, which is incorporated herein by reference. An example of a measurement of the decay time of the luminescence after termination of an excitation pulse, as a measurement of temperature, is described in U.S. Pat. No. 4,652,143, which is incorporated herein by reference.

Figure 2A:
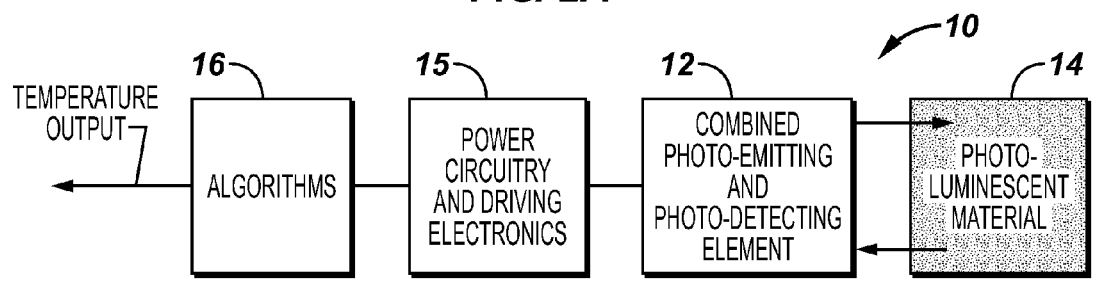
FIG. 2A is a schematic diagram of an embodiment of a photoluminescent temperature sensor according to one or more aspects of the invention.
Figure 2B:
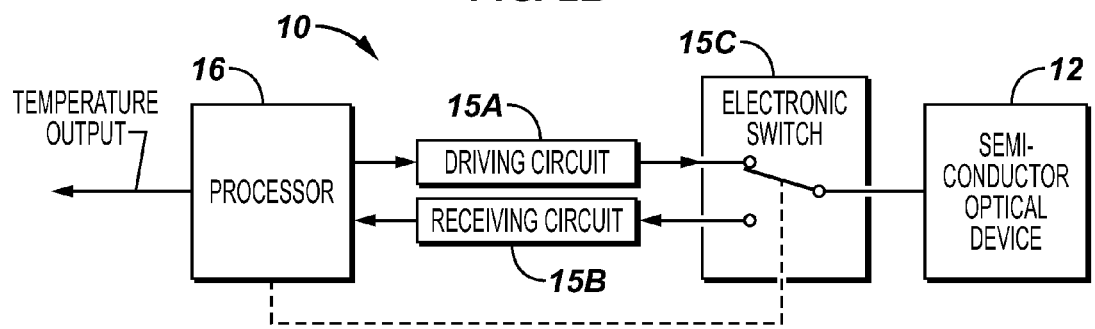
FIG. 2B is a schematic diagram of an embodiment of an optical device driving circuit according to one or more aspects of the invention.

Embodiments of a photoluminescent temperature sensor, generally denoted by the number 10, according to one or more aspects of the invention are now described with reference to FIGS. 2A, 2B, and 3. Sensor 10 comprises a single semiconductor optical device 12 which comprises an active component, such as without limitation an LED or laser. Optical device 12 combines the functions of photo-emitting and photo-detecting, such that an active region which emits light is the same active region which detects light. A photoluminescent material 14 is optically connected to optical device 12 with a light coupling conduit, such as an optical fiber 20 or fibers. Optical device 12 emits light which is directed to photoluminescent material 14, receives photoluminesced light from photoluminescent material 14, and generates signal information derived from the received photoluminesced light. Optical device 12 is connected to a driving/receiving circuit 15, which in turn is connected to a processor 16 having functional components for driving optical device 12, and for processing the signal information to derive temperature information.

Driving/receiving circuit 15 comprises a driving circuit 15A for actuating the photo-emission configuration of optical device 12, and a receiving circuit 15B for the output resulting from photo-detection by optical device 12. Circuit 15 further comprises a switch 15C that is operated by processor 16 to flip back and forth between photo-emission and photo-detection modes.

Figure 3:
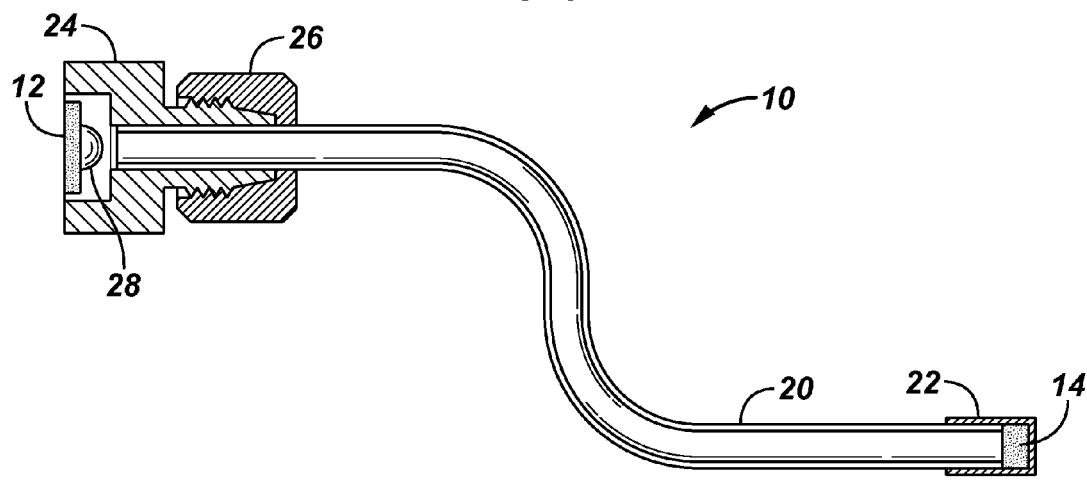
FIG. 3 is a cut-away view of an embodiment of a photoluminescent temperature sensor according to one or more aspects of the invention.

In the embodiment depicted in FIG. 3, semi-conductor optical device 12 comprises an LED. The active region or silicon junction of LED 12 allows both photon emission (electroluminescence) and photon detection. According to at least one embodiment, a structural cap 22 holds the photoluminescent material 14 adjacent to the exposed end of optic fiber 20. Cap 22 may be a discrete item, or an extruded portion of the fiber jacketing, or any methodology that is capable of holding photoluminescent material 14 adjacent to the end of optic fiber 20. The other end of optic fiber 20 is held adjacent to LED 12 by a mounting block 24 and connector 26. The combined action of mounting block 24 and connector 26 positions optic fiber 20 and LED 12 such that photons can efficiently be coupled from LED 12 to fiber 20 and vice-versa. In one embodiment, LED 12 is positioned behind a lens 28 to improve optical coupling between optical device 12 and fiber 20. The structure by which optical device 12, optic fiber 20 and photoluminescent material 14 are positioned relative to each other is not essential to the claimed invention, unless specifically recited to be limiting.

Figure 4A:
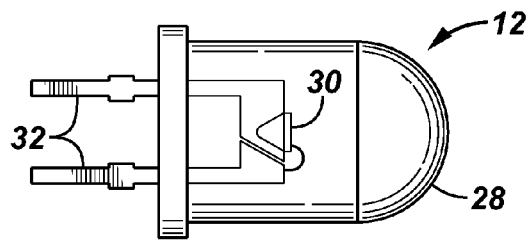
FIGS. 4A, 4B are respectively side and end views of an embodiment of a light emitting diode optical device according to one or more aspects of the invention.
Figure 4B:
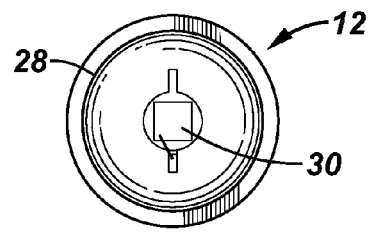
Figure 4C:
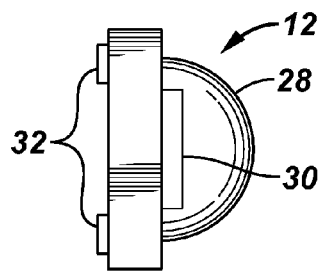
FIGS. 4C, 4D are respectively side and end views of another embodiment of a light emitting diode optical device according to one or more aspects of the invention.
Figure 4D:
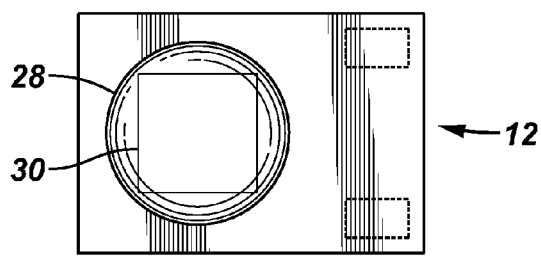

An exemplary installation of an LED optical device 12 is shown in FIGS. 4A and 4B. LED optical device 12 comprises a substrate onto which the circuitry and LED die 30 are mounted. LED die 30 performs the function of the active region or silicon junction described above. In addition, a lens 28 may be mounted over LED die 30 to control the direction of incident photons. Electrical contacts 32 are accessible for providing the currents and voltages needed to utilize the LED as a single optical device. An alternative installation of an LED optical device 12 is shown in FIGS. 4C and 4D.

Photoluminescent material 14, frequently referred to as a "phosphor", may comprise a host material enhanced with an active material which provides the desired photoluminescent properties, allowing a large assortment of possible options. Some common photoluminescent materials include, without limitation, Ruby ($Al_2O_3:Cr^{3+}$) as described for example in U.S. Pat. No. 4,776,827 which is incorporated by herein by reference; variations of magnesium germanate ($Mg_{28}Ge_{10}O_{48}$) activated with tetravalent manganese ($Mn^{4+}$), which is described in U.S. Pat. No. 4,652,143, which is incorporated herein by reference; and $Mg_4FGeO_6$ also activated with tetravalent manganese ($Mn^{4+}$). Many phosphors exist, each with properties that may be better suited for particular applications. Fluorescent lamps and display devices often incorporate phosphors to allow the generation of colored light from light of different spectral distribution.

Figure 5:
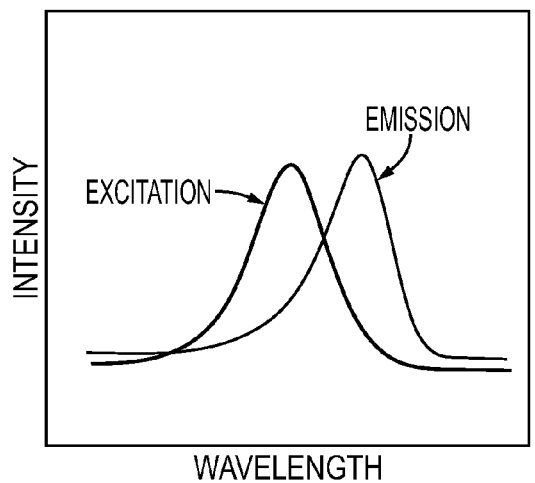
FIG. 5 is a graphical representation of emission and excitation curves for an exemplary photoluminescent material.

In the prior art devices, where there is segregation in the excitation and detected emission curves, the photo-emitter may be tuned to the excitation wavelength while the photo-detector may be optimized to detect the photoluminescent wavelength. In embodiments of the invention, because a single optical device 12 is used for both emission and detection, the excitation and detection wavelengths must overlap to some extent. Furthermore, the emission band of the optical device 12 should fall ideally within this overlap region as the optical device 12 is typically sensitive in the same wavelength band where it emits. This overlap of emission and excitation wavelengths of photoluminescent material 14 and the emission spectrum of LED optical device 12 allows a single LED optical device 12 to both excite and detect photons from photoluminescent material 14. FIG. 5 illustrates an exemplary emission and excitation curve for a phosphor with such an overlap. The amount of overlap between these wavelength bands need not be strictly quantified, but must be significant enough to allow optical device 12 to detect the emissions from photoluminescent material 14. In one embodiment, the photoluminescent emission spectrum will have a Full Width at Half Maximum bandwidth (FWHM) of between about 10 nm to about 30 nm.

LED optical device 12, when driven by appropriate currents or voltages, is capable of emitting photons of narrow spectral bandwidth, and as a photodetector is also capable of outputting signal information, which may comprise either a current or voltage that is proportional to the flux of photoluminescent light. In one embodiment, processor 16 processes the signal information received through receiving circuit 15B. This signal information comprises data related to time decay of the photoluminescent photon flux. As shown in FIG. 1, the relationship between photon flux and time is temperature-dependent. This temperature dependency means that for any given temperature of the photoluminescent material, within reasonable operating parameters, a unique time decay curve exists. Therefore, where the signal information comprises a time decay curve, a corresponding temperature may be determined by a suitable algorithm.

Figure 6:
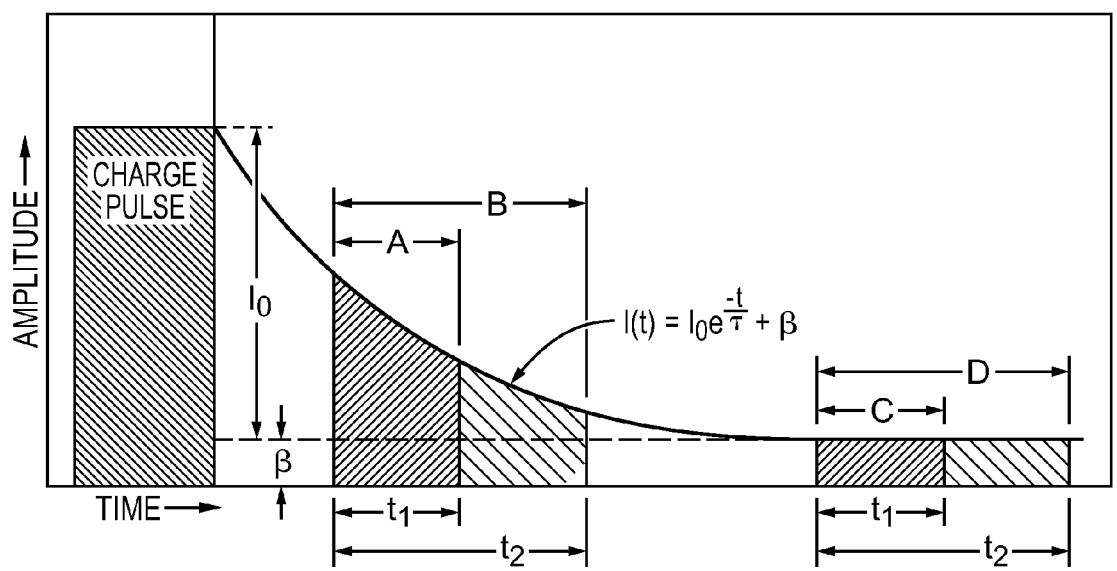
FIG. 6 is a graphical representation of charge pulse followed by photon flux decay.

A standard photon flux decay of a photoluminescent source is shown in FIG. 6, which schematically depicts an embodiment of a method of measuring photon flux decay to a background or offset level. Various integration algorithms are known which allow for decay time calculation from a plurality of integrals of signal with known integration windows, and with the offsets (β) subtracted. The offset signal measurement is taken at some point after more than 3×τ has elapsed, where τ is defined as the time constant for the photon flux to decay to 1/e (~63.2%) of its asymptotic or final level. In this scenario, the background signal is assumed to be comprised of only a static offset signal which is a DC level having no time dependency during the measurement period. The value representative of the time decay of the photoluminescent light may comprise τ or any other value quantifying the photon flux decay. This value may be correlated with temperature in a look-up table, or by an algebraic relationship. The temperature value may then be outputted in conventional fashion.

In one embodiment, the value of τ can be derived by solving the equation (Sholes and Small):

$$\frac{A-C}{B-D} = \frac{1-e^{\frac{-t_1}{\tau}}}{1-e^{\frac{-t_2}{\tau}}} \quad \text{(Equation 1)}$$

With the following simplification, $$t_1 = \frac{t_2}{2} = t \quad \text{(Equation 2)}$$

Allows the following substitution for the offset β, $$C = D/2 = \beta * t \quad \text{(Equation 3)}$$

Which results in further simplification for a relationship for τ:

$$\tau = t * \ln\left[\frac{A - \beta * t}{B - A - \beta * t}\right] \quad \text{(Equation 4)}$$

where:
t is the length of integration window;
A is the integral of signal from $t_0$ to $t_0+t$; and
B is the integral of signal from $t_0$ to $t_0+2t$.

Figure 7:
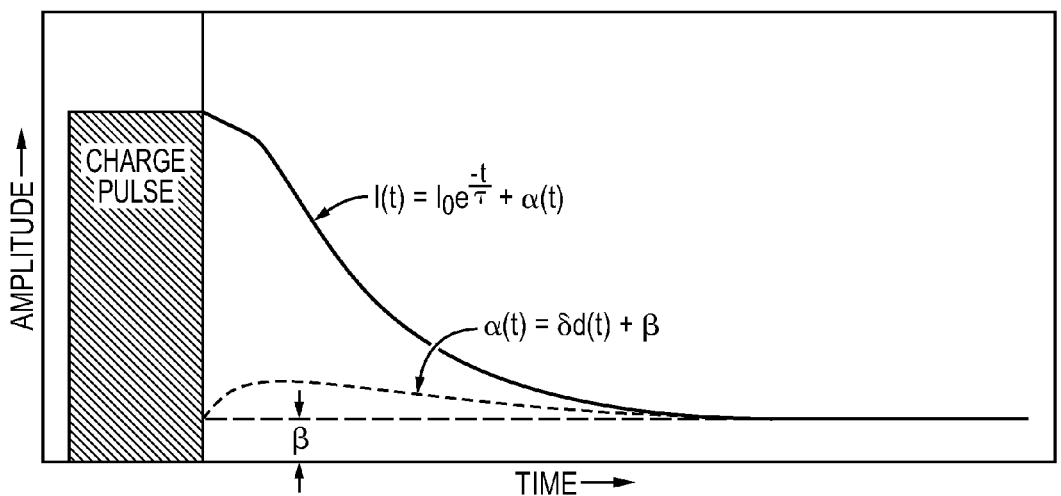
FIG. 7 is a graphical representation of background signals.

If the background signal is not a static offset similar to β in FIG. 6, then some variations may be provided to account for any fluctuation of the background signal. In one embodiment, the background signal may change slightly during the measurement period following the charge pulse, as is shown in FIG. 7. In this example, the background signal α(t) has two components, a time dependant signal δ(t) and the offset β. Changes in these parameters will affect the decay time measurement of the sensor, and therefore affect the temperature measurement. There are many possible parameters that could cause fluctuations in the time dependant portion of the background signal, but there are two that warrant particular consideration. The first may be caused by heating of the LED itself during the charge pulse phase, and the second may be caused by changing sensitivity of the LED as its ambient temperature rises.

In one embodiment, the background signal α(t), as shown in FIG. 7, may be compensated for by characterizing the background signal without the charge pulse signal and subsequently compensating for this background. This could be effective if the background signal would have only a time dependency. However, the background signal may also be dependent on the LED environmental temperature, which may also be characterized and compensated.

In one exemplary embodiment, the time and environmental background signal dependency can both be compensated for by taking advantage of the fact that the background signal is almost independent of driving current within a particular operational band of optical device 12 used for excitation and detection. Therefore, the background signal may be removed by collecting time decay data resulting from charge pulses of two distinct amplitudes (a low and high driving current) and differencing them. The measurements in both cases will show almost identical background signals, which then get subtracted every measurement cycle, effectively removing their influence. By its nature, this algorithm is inherently immune not only to the time dependent background signal, but as well to any background signal long term ageing or drift.

Figure 8:
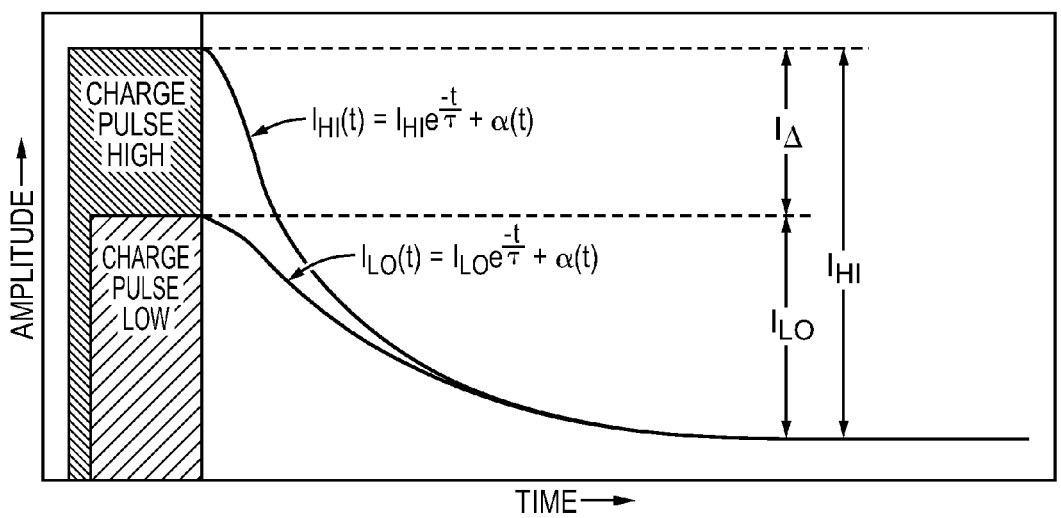
FIG. 8 is a graphical representation of photon flux decay resulting from a low amplitude charge pulse and a high amplitude charge pulse, with resulting differing photo flux decay.

A schematic graph of photon flux decay with a high amplitude pulse, and a low amplitude pulse is shown in FIG. 8. In one embodiment, the value of τ can be derived by the subtraction of the two equations that describe the decay properties. More specifically, this allows the generation of another function $I_F(t)$ that will have the same time decay characteristics as $I_H(t)$ and $I_L(t)$ without the background effects.

$$I_F(t) = I_{Hi}^{(t)} - I_{Lo}^{(t)} \quad \text{(Equation 5)}$$

Giving, $$I_F(t) = I_\Delta(t) * e^{\frac{-t}{\tau}} = I_{Hi}(t) * e^{\frac{-t}{\tau}} - I_{Lo}(t) * e^{\frac{-t}{\tau}} \quad \text{(Equation 6)}$$

Inserting the relationship of Equation 6 into the Equation 4 relationship for $\tau$, provides:

$$\tau = t * \ln \frac{(A_{Hi} - A_{Lo})}{(B_{Hi} - A_{Hi}) - (B_{Lo} - A_{Lo})} \quad \text{(Equation 7)}$$

where:
 $A_{Hi}$ is the value for integral A during the high pulse;
 $A_{Lo}$ is the value for integral A during the low pulse;
 $B_{Hi}$ is the value for integral B during the high pulse; and
 $B_{Lo}$ is the value for integral B during the low pulse.

In one embodiment, controller 16 may be configured to provide a strobed series of low amplitude pulses and high amplitude pulses, and the resulting signal information is then averaged for each, with the average values being used in a suitable algorithm. Alternatively, a median value, or some other statistically representative value may be used.

The algorithms described above may be implemented in software, firmware or hardware, or combinations thereof. The system components shown in the Figures or described above may be or may include a computer or multiple computers. The components may be described in the general context of computer-executable instructions, such as program modules, being executed by a computer. Generally, program modules include routines, programs, objects, components, data structures, etc., that perform particular tasks or implement particular abstract data types.

The processing unit that executes commands and instructions may utilize any of a wide variety of other technologies including a special purpose computer, a microcomputer, mini-computer, mainframe computer, programmed microprocessor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention. The computer system may include a general purpose computing device in the form of a computer including a processing unit, a system memory, and a system bus that couples various system components including the system memory to the processing unit. Although many internal components of the computer or microprocessor device are not shown, those of ordinary skill in the art will appreciate that such components and the interconnections are well known.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A system for determining a temperature in an environment, comprising:
 a semi-conductor optical device element to operate as both a light-emitting device and a light detection device;
 a photoluminescent material to be disposed within the environment, wherein the photoluminescent material has an excitation band that overlaps a portion of the material's emission band which in turn both overlap a portion of the emission band of the semi-conductor optical device element;
 an optic fiber disposed between the semi-conductor optical device and the photoluminescent material to transmit incident light from the semi-conductor optical device element configured as a photo-emitter to the photoluminescent material, and to transmit photoluminescent light from the photoluminescent material to the same semi-conductor optical device element configured as photo-detector;
 a circuit to drive the optical device element including a switch; and
 a processor operatively connected to the driving circuit and configured to drive the optical device element to emit the incident light, thereby producing the photoluminescent light from the photoluminescent material, and to derive temperature information from the photoluminescent light received at the optical device element.

2. The system of claim 1, wherein the semi-conductor optical device is a light emitting diode.

3. A method of determining a temperature of an environment, comprising:
 using a single optical device element optically connected to a photoluminescent material disposed within the environment;
 emitting a pulse of incident light in response to driving the single optical device element, the driving the single optical device element comprises driving the optical device at a low amplitude and a high amplitude to emit a low amplitude pulse of incident light and a high amplitude pulse of incident light respectively;
 producing photoluminescent light from the photoluminescent material in response to the incident light;
 receiving the photoluminescent light with the single optical device element;
 creating signal information associated with a temperature-dependent characteristic of the photoluminescent light received, wherein the signal information is characteristic of the photoluminescent light received at both the low amplitude and the high amplitude; and
 deriving temperature information from the signal information, comprising:
  deriving a value representing the difference between the low amplitude signal information and the high amplitude signal information;

determining the rate of decay of the photoluminescent light; and calculating a value representative of the time decay of the photoluminescent light relative to temperature.

4. The method of claim 3, wherein the single optical device element is strobed with alternating series of low amplitude pulses and high amplitude pulses, and the resulting signal information is the average or median value for each of a plurality of low amplitude pulses and high amplitude pulses.

5. The method of claim 3, wherein the photoluminescent material has an excitation band that overlaps a portion of the material's emission band which in turn both overlap a portion of the emission band of the single optical device element.

6. A temperature sensor, the sensor comprising a photoluminescent material optically connected to a single optical device element, wherein the single optical device element emits an incident light to the photoluminescent material and receives a photoluminescent light produced in response to the incident light, wherein the photoluminescent material has an excitation band that overlaps a portion of the material's emission band which in turn both overlap a portion of the emission band of the single optical device element.

7. The sensor of claim 6, wherein the single optical device element comprises a light emitting diode.

8. The sensor of claim 6, further comprising a circuit to drive the single optical device element to emit the incident light.

9. A temperature sensor for determining a temperature in an environment, the temperature sensor comprising:

a photoluminescent material to be disposed within the environment, the photoluminescent material having an excitation band that overlaps a portion of the photoluminescent material's emission band;

an optical device to emit incident light onto the photoluminescent material and to receive photoluminescent light emitted from the material, wherein the emission band and excitation band of the photoluminescent material overlap a portion of an emission band of the optical device; and an optic conductor to transmit the incident light from the optical device to the photoluminescent material and to transmit the photoluminescent light from the photoluminescent material to the optical device.

10. The temperature sensor of claim 9, wherein the optical device is a light emitting diode.

11. The temperature sensor of claim 9, comprising:

a driving circuit connected to the optical device to operate the optical device in a photo-emission mode to emit the incident light; and a receiving circuit connected to the optical device to operate the optical device in a photo-detection mode to receive the photoluminescent light.

12. A method of determining a temperature of an environment, comprising:

using a single optical device element optically connected to a photoluminescent material disposed within the environment, wherein the photoluminescent material has an excitation band that overlaps a portion of the material's emission band which in turn both overlap a portion of the emission band of the single optical device element;

emitting a pulse of incident light in response to driving the single optical device element;

producing photoluminescent light from the photoluminescent material in response to the incident light;

receiving the photoluminescent light with the single optical device element;

creating signal information associated with a temperature-dependent characteristic of the photoluminescent light received; and deriving temperature information from the signal information.

13. The method of claim 12, wherein the deriving the temperature information comprises:

determining the rate of decay of the photoluminescent light;

calculating a value representative of the time decay of the photoluminescent light relative to temperature.

14. The method of claim 12, wherein the emitting the incident light comprises driving the single optical device element at a low amplitude and a high amplitude to emit a low amplitude pulse of incident light and a high amplitude pulse of incident light respectively, and the signal information is received from the single optical device element characteristic of the photoluminescent light at both the low amplitude and the high amplitude, and the temperature information is derived from a value representative of the difference between the low amplitude signal information and the high amplitude signal information.

15. The method of claim 14, wherein the single optical device element is strobed with alternating series of low amplitude pulses and high amplitude pulses, and the resulting signal information is the average or median value for each of a plurality of low amplitude pulses and high amplitude pulses.

* * * * *

UNITED STATES PATENT AND TRADEMARK OFFICE
CERTIFICATE OF CORRECTION

PATENT NO.       : 8,751,188 B2
APPLICATION NO.  : 13/089183
DATED            : June 10, 2014
INVENTOR(S)      : Roy Belak It is certified that error appears in the above-identified patent and that said Letters Patent is hereby corrected as shown below:

In the Specification

Column 6, Line 20, Equation 4

Replace $\tau = t * \ln\left[\dfrac{A-\beta*t}{B-A-\beta*t}\right]$

With $\tau = t/\ln \dfrac{A-\beta*t}{B-A-\beta*t}$

Signed and Sealed this
Second Day of September, 2014

Michelle K. Lee
*Deputy Director of the United States Patent and Trademark Office*